US011718989B2

(12) United States Patent
Baily et al.

(10) Patent No.: US 11,718,989 B2
(45) Date of Patent: Aug. 8, 2023

(54) MODIFIED FOAM WALL STRUCTURES WITH HIGH RACKING STRENGTH AND METHODS FOR THEIR MANUFACTURE

(71) Applicant: Covestro LLC, Pittsburgh, PA (US)

(72) Inventors: David M. Baily, Upper Saint Clair, PA (US); James L. Lambach, McMurray, PA (US); Michael F. Palmosina, II, Baden, PA (US)

(73) Assignee: Covestro LLC, Pittsburgh, PA (US)

( * ) Notice: Subject to any disclaimer, the term of this patent is extended or adjusted under 35 U.S.C. 154(b) by 38 days.

(21) Appl. No.: 17/481,523

(22) Filed: Sep. 22, 2021

(65) Prior Publication Data

US 2022/0002998 A1  Jan. 6, 2022

Related U.S. Application Data

(63) Continuation of application No. 16/151,492, filed on Oct. 4, 2018, now Pat. No. 11,519,172.

(51) Int. Cl.
| | | |
|---|---|---|
| *E04C 2/38* | (2006.01) | |
| *E04B 1/26* | (2006.01) | |
| *E04B 1/343* | (2006.01) | |
| *E04B 1/74* | (2006.01) | |
| *E04B 2/56* | (2006.01) | |
| *E04B 1/38* | (2006.01) | |

(52) U.S. Cl.
CPC ............... *E04C 2/386* (2013.01); *E04B 1/26* (2013.01); *E04B 1/34321* (2013.01); *E04B 1/74* (2013.01); *E04B 2/562* (2013.01); *E04B 2001/386* (2013.01); *E04B 2103/04* (2013.01)

(58) Field of Classification Search
CPC ........ E04C 2/386; E04B 1/34321; E04B 1/74; E04B 2/562; E04B 1/14; E04B 1/7604; E04B 1/80; E04B 1/26; E04B 2001/386
See application file for complete search history.

(56) References Cited

U.S. PATENT DOCUMENTS 3,573,145 A  3/1971 Witkosky et al.
3,641,724 A  2/1972 Palmer
(Continued)

FOREIGN PATENT DOCUMENTS

CN       102417578 A   4/2012
DE   202014004695 U1   7/2014
(Continued)

OTHER PUBLICATIONS

"Polyurethanes: Chemistry and Technology, Part II Technology," J. H. Saunders & K. C. Frisch, Interscience Publishers, 1964, p. 239.

*Primary Examiner* — Brian D Mattei
*Assistant Examiner* — Charissa Ahmad
(74) *Attorney, Agent, or Firm* — Donald R. Palladino (57) ABSTRACT

Modified and connected foam wall structures and methods for making them are described. The wall structures include a frame, a foam panel attached to the frame, a foam layer disposed in a cavity defined by the frame, and a structural adhesive. The structural adhesive may be disposed in at least one of: (A) an aperture located within the foam layer, and (B) an aperture located between the foam layer and a frame member. In some cases, a cured structural adhesive is located between connecting members of adjacent foam wall structures.

17 Claims, 5 Drawing Sheets

(56) References Cited

U.S. PATENT DOCUMENTS

| | | |
|---|---|---|
| 3,785,913 A | 1/1974 | Hallamore |
| 4,298,724 A | 11/1981 | Sommerfeld et al. |
| 4,318,258 A | 3/1982 | Heck |
| 4,351,873 A | 9/1982 | Davis |
| 4,443,988 A | 4/1984 | Coutu, Sr. |
| 4,471,591 A | 9/1984 | Jamison |
| 4,671,038 A | 6/1987 | Porter |
| 4,748,781 A | 6/1988 | Wencley |
| 4,765,105 A | 8/1988 | Tissington et al. |
| 4,781,986 A | 11/1988 | Alvino |
| 4,856,244 A | 8/1989 | Clapp |
| 4,914,883 A | 4/1990 | Wencley |
| 5,024,033 A | 6/1991 | Anderson |
| 5,172,532 A | 12/1992 | Gibbar, Jr. |
| 5,353,560 A | 10/1994 | Heydon |
| 5,353,563 A | 10/1994 | White |
| 5,389,167 A | 2/1995 | Sperber |
| 5,410,011 A | 4/1995 | Konishi et al. |
| 5,641,368 A * | 6/1997 | Romes ............... E04F 21/085 52/742.13 |
| 5,765,330 A | 6/1998 | Richard |
| 5,950,386 A | 9/1999 | Shipman et al. |
| 5,950,389 A | 9/1999 | Porter |
| 5,953,883 A | 9/1999 | Ojala |
| 5,979,131 A | 11/1999 | Remmele et al. |
| 6,026,628 A | 2/2000 | Lopez |
| 6,085,479 A | 7/2000 | Carver |
| 6,205,729 B1 | 3/2001 | Porter |
| 6,308,491 B1 | 10/2001 | Porter |
| 6,314,695 B1 | 11/2001 | Belleau |
| 6,332,304 B1 | 12/2001 | Fuhrman |
| 6,408,594 B1 | 6/2002 | Porter |
| 6,438,915 B1 | 8/2002 | Beauboeuf |
| 6,481,172 B1 | 11/2002 | Porter |
| 6,579,586 B1 | 6/2003 | Fay et al. |
| 6,635,723 B1 | 10/2003 | Maier et al. |
| 6,854,218 B2 | 2/2005 | Weiss |
| 6,875,472 B2 | 4/2005 | Bhattacharya et al. |
| 6,951,079 B2 | 10/2005 | Weiss |
| 7,036,284 B1 | 5/2006 | Larson |
| 7,127,856 B2 | 10/2006 | Hagen, Jr. et al. |
| 7,127,858 B2 | 10/2006 | Layfield |
| 7,168,216 B2 | 1/2007 | Hagen, Jr. |
| 8,033,065 B2 | 10/2011 | Paetkau et al. |
| 8,065,846 B2 | 11/2011 | McDonald et al. |
| 8,365,497 B2 | 2/2013 | Rothwell |
| 8,397,387 B2 | 3/2013 | Cole et al. |
| 8,397,465 B2 | 3/2013 | Hansbro et al. |
| 8,458,983 B2 | 6/2013 | Propst |
| 8,635,778 B2 | 1/2014 | Hagaman |
| 8,844,243 B1 | 9/2014 | Gillman |
| 8,853,536 B2 * | 10/2014 | Kim ................ H01R 13/03 174/120 AR |
| 8,875,475 B2 | 11/2014 | Schwartau |
| 8,925,270 B2 | 1/2015 | Grisolia et al. |
| 8,959,862 B1 | 2/2015 | Kreizinger |
| 9,260,865 B2 * | 2/2016 | Rothwell ............ E04C 2/386 |
| 9,523,195 B2 | 12/2016 | Nandi et al. |
| 9,562,359 B1 | 2/2017 | Grisolia et al. |
| 9,702,152 B2 | 7/2017 | Sievers et al. |
| 9,938,711 B2 | 4/2018 | Grisolia et al. |
| 10,167,630 B2 | 1/2019 | Giles |
| 10,227,779 B2 | 3/2019 | Steppan et al. |
| 10,385,566 B2 | 8/2019 | Carlson |
| 10,415,244 B2 | 9/2019 | Giles et al. |
| 10,570,622 B1 | 2/2020 | Lambach et al. |
| 2003/0041544 A1 | 3/2003 | Rusek, Jr. et al. |
| 2003/0073765 A1 | 4/2003 | Ddamulire et al. |
| 2003/0125449 A1 | 7/2003 | Chen et al. |
| 2003/0126817 A1 | 7/2003 | Gleeson et al. |
| 2004/0016194 A1 | 1/2004 | Stefanutti et al. |
| 2004/0128932 A1 * | 7/2004 | Estape ............... E04C 2/205 52/506.01 |
| 2004/0200171 A1 | 10/2004 | Schilger |
| 2005/0055973 A1 | 3/2005 | Hagen, Jr. et al. |
| 2005/0106360 A1 | 5/2005 | Johnston et al. |
| 2005/0247021 A1 | 11/2005 | Schauffele |
| 2006/0201089 A1 * | 9/2006 | Duncan ............... E04B 1/767 52/309.8 |
| 2007/0163196 A1 | 7/2007 | Barrow |
| 2008/0104913 A1 | 5/2008 | Messenger et al. |
| 2010/0011701 A1 | 1/2010 | Cole et al. |
| 2010/0068423 A1 | 3/2010 | Molla et al. |
| 2010/0175810 A1 | 7/2010 | Korwin-Edson et al. |
| 2010/0300037 A1 | 12/2010 | Turner et al. |
| 2010/0325999 A1 | 12/2010 | Devalapura |
| 2011/0115991 A1 | 5/2011 | Sawaki |
| 2011/0173911 A1 | 7/2011 | Propst |
| 2011/0214374 A1 | 9/2011 | Propst |
| 2012/0011792 A1 | 1/2012 | DeWildt et al. |
| 2012/0028563 A1 | 2/2012 | Sacks et al. |
| 2012/0096785 A1 | 4/2012 | Weeks |
| 2012/0240501 A1 | 9/2012 | Spiegel |
| 2012/0247040 A1 | 10/2012 | Buoni et al. |
| 2012/0291384 A1 | 11/2012 | Martens |
| 2013/0104480 A1 | 5/2013 | Smith |
| 2013/0305643 A1 | 11/2013 | Singleton et al. |
| 2013/0312350 A1 | 11/2013 | Kreizinger |
| 2014/0115991 A1 | 5/2014 | Sievers et al. |
| 2014/0202097 A1 | 7/2014 | Rodgers |
| 2014/0265027 A1 | 9/2014 | Kreizinger |
| 2015/0093535 A1 | 4/2015 | Lambach et al. |
| 2017/0368785 A1 | 12/2017 | Fox et al. |

FOREIGN PATENT DOCUMENTS

| | | | |
|---|---|---|---|
| EP | 2369084 A2 | 9/2011 | |
| JP | H02212510 A * | 8/1990 | ............ B32B 25/20 |
| JP | 09256641 A * | 9/1997 | |
| JP | 2004042335 A | 2/2004 | |
| JP | 2005298588 A | 10/2005 | |
| KR | 2011029789 A * | 3/2011 | ............ B32B 25/20 |
| KR | 101194574 B1 * | 10/2012 | |
| WO | 9914442 | 3/1999 | |
| WO | 9929978 | 6/1999 | |
| WO | 2009006441 A2 | 1/2009 | |
| WO | 2010030596 A1 | 3/2010 | |

* cited by examiner

MODIFIED FOAM WALL STRUCTURES WITH HIGH RACKING STRENGTH AND METHODS FOR THEIR MANUFACTURE

CROSS-REFERENCE TO RELATED APPLICATION

This application is a continuation of U.S. patent application Ser. No. 16/151,492, which is incorporated herein by reference.

FIELD

The present invention relates to foam wall structures and methods for modifying such structures in a way that the structural integrity of the wall structure is not significantly compromised.

BACKGROUND

Relatively recently, insulated wall structures satisfying strict industry insulation requirements have been developed that can be made without excessive material and labor costs. According to one proposal, a foam wall structure includes a foam panel, such as a faced polyisocyanurate panel, attached to at least a portion of a front frame surface, such that the faced polyisocyanurate panel and frame members define one or more voids within the frame; and a foam layer received within at least a portion of one of the voids within the frame, wherein the foam layer adheres to at least a portion of the faced polyisocyanurate panel.

Such foam wall structures can provide many benefits. They can exhibit high racking strength and excellent thermal resistance. Moreover, they can be fabricated in a controlled, possibly highly automated, manufacturing facility that is away from the construction site, thus increasing the likelihood of consistent results/performance, all while reducing labor and material costs.

In some cases, however, modification to the foam wall structure may be required, sometimes at the construction site. The need for such modifications can arise for a variety of reasons. For example, the wall structure may need to be modified to correctly fit adjacent wall structures together to meet the size requirements of a building foundation or the concrete slab poured for the building. In addition, the foam panel and/or the foam layer may be damaged during, for example, delivery to the construction site or during installation at the construction site.

It would be desirable, therefore, to provide a method to modify and/or repair a foam wall structure that is not labor or material intensive, does not damage the foam layer or the foam panel, and that does not significantly compromise, if at all, the racking strength of the foam wall structure.

The present invention has been made in view of the foregoing.

SUMMARY

In certain respects, the specification relates to foam wall structures. These foam wall structures comprise: (a) frame members comprising: (i) a first member; (ii) a second member spaced apart from the first member; and (iii) connecting members extending between the first member and the second member, wherein the first member, the second member, and the connecting members each comprise a front surface and a rear surface that form a front frame surface and a rear frame surface; (b) a foam panel attached to the front frame surface, wherein: (i) the foam panel overlies the front frame surface; and (ii) the foam panel, the first member, the second member, and the connecting members define a cavity; (c) a foam layer disposed within the cavity and adhered to the foam panel, and (d) a cured structural adhesive disposed in at least one of (i) an aperture located within the foam layer, and (ii) an aperture located between the foam layer and a frame member, wherein the cured structural adhesive is the cured product of a high solids-containing chemically-curing polymeric structural adhesive composition. Some aspects of the specification relate to methods for modifying foam wall structures so as to produce such foam wall structures.

In other respects, the specification relates to adjacent foam wall structures, in which the foam wall structures each comprise: (a) frame members comprising: (i) a first member; (ii) a second member spaced apart from the first member; and (iii) connecting members extending between the first member and the second member, wherein the first member, the second member, and the connecting members each comprise a front surface and a rear surface that form a front frame surface and a rear frame surface; (b) a foam panel attached to the front frame surface, wherein: (i) the foam panel overlies the front frame surface; and (ii) the foam panel, the first member, the second member, and the connecting members define a cavity; and (c) a foam layer disposed within the cavity, wherein the foam layer adheres to the foam panel. The adjacent foam wall structures comprise a cured structural adhesive located by connecting members of the adjacent foam wall structures. The cured structural adhesive is the cured product of a high solids-containing chemically-curing polymeric structural adhesive composition. Some aspects of the specification relate to methods for joining adjacent foam wall structures.

The present specification also relates to, among other things, buildings comprising such wall structures and connected foam wall structures.

BRIEF DESCRIPTION OF THE DRAWINGS

Various features and characteristics of the inventions described in this specification may be better understood by reference to the accompanying figures, in which.

The reader will appreciate the foregoing features and characteristics, as well as others, upon considering the following detailed description of the inventions according to this specification.

DETAILED DESCRIPTION

As used in this specification, the term "front" refers to the side, face, or surface of a structure or component oriented towards the outside direction of an exterior wall of a building, and the term "rear" refers to the side, face, or surface of a structure or component oriented towards the inside direction of an exterior wall of a building.

Figure 1:
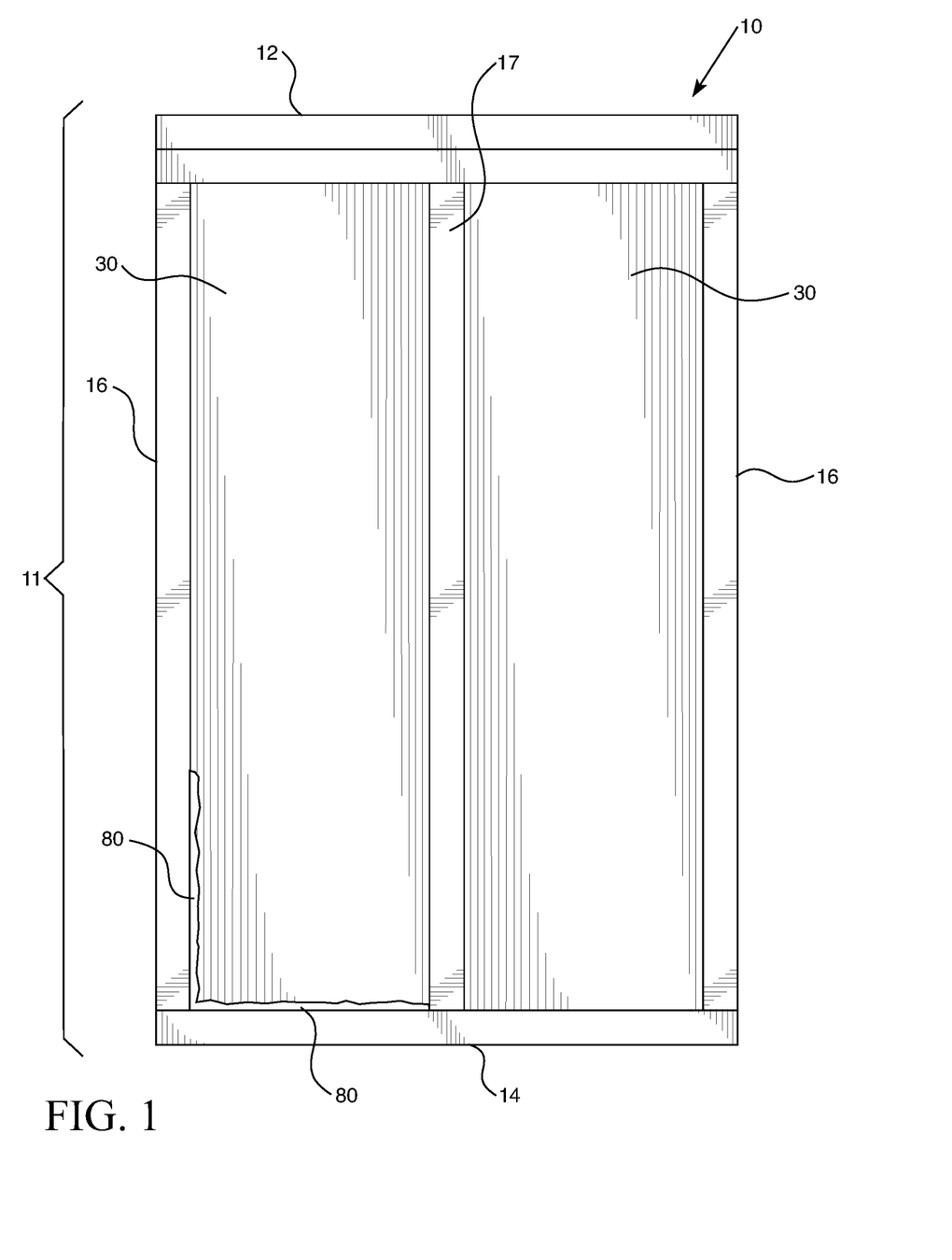
FIG. 1 is a rear view of a wall structure comprising a frame, a foam panel attached to the frame, a foam layer disposed within a cavity defined by the foam panel and the frame members, and a cured structural adhesive disposed in apertures located between the foam layer and frame members.
Figure 2:
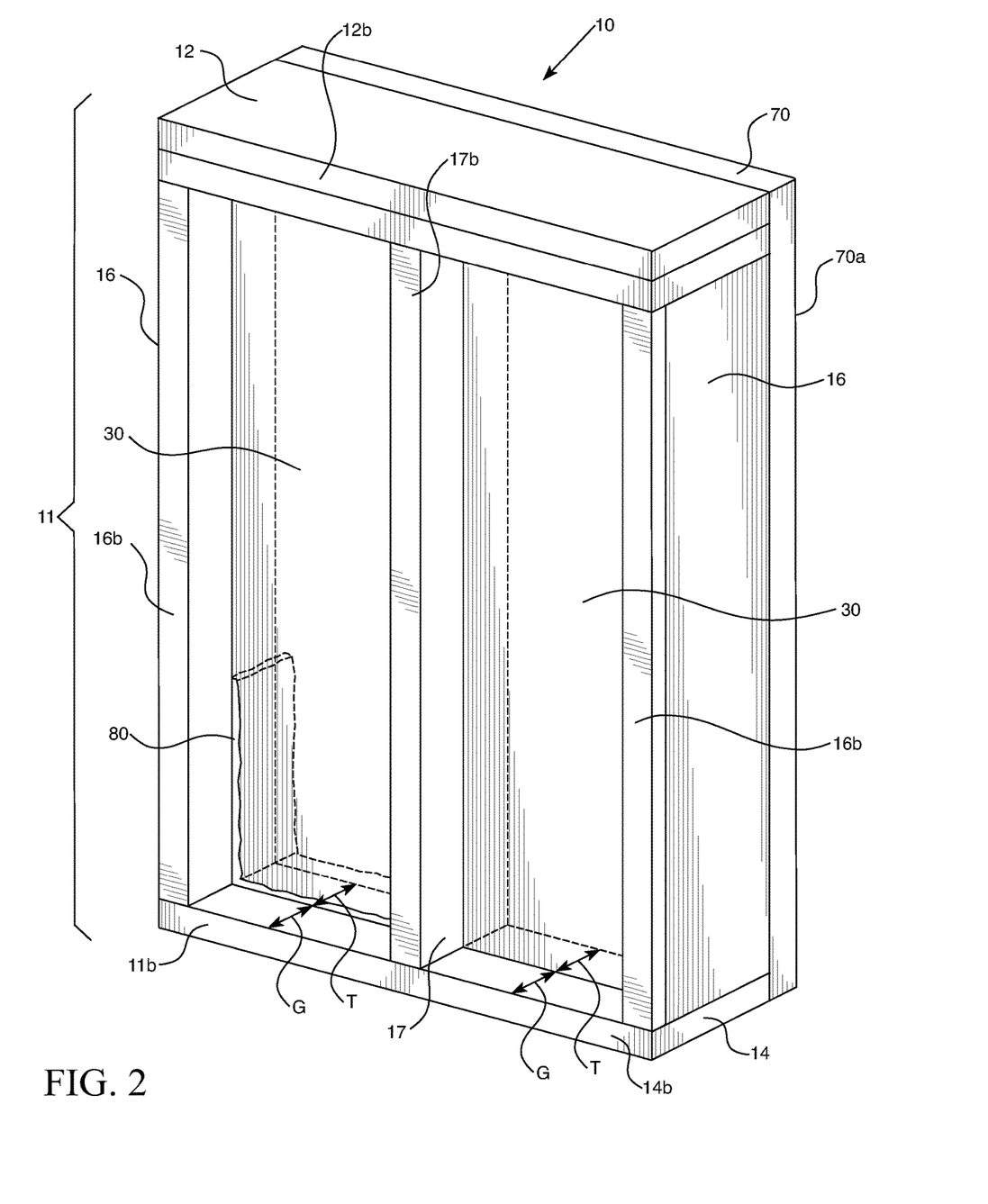
FIG. 2 is a rear perspective view of the wall structure shown in FIG. 1

The present specification is directed to foam wall structures, methods for their manufacture, and use of such structures as a wall in a building. Referring first to FIGS. 1 and 2, a wall structure 10 comprises frame 11. The frame 11 comprises a first member 12, a second member 14 spaced apart from the first member 12, and connecting members (such as the two side members and primary support member) 16 extending between the first member 12 and the second member 14. As used herein, the term "connecting member" refers to a member that connects first member 12 with second member 14 and includes side members 16 and primary support members 17. The first member 12, the second member 14, and the connecting members 16 each comprise a front surface (12a, 14a, and 16a, respectively) and a rear surface (12b, 14b, and 16b, respectively) that collectively form a front frame surface 11a and a rear frame surface 11b. The constituent members (12, 14, and 16) of the frame 11 can be made out of a suitable material of construction such as wood. For example, the constituent members (12, 14, and 16) of the frame 11 can comprise wooden 2×4 members (i.e., structural members made of wood having nominal thicknesses of about 2-inches, nominal widths of about 4-inches, and suitable lengths) secured together with fasteners such as nails, nail plates, screws, staples, bolts, or rivets, or a combination of any thereof.

A foam panel 70 may be attached to the front frame surface 11a so that the first foam panel overlies the front frame surface. As used in this specification, the term "foam panel" refers to panels comprising foam, such as, for example, polyisocyanurate (sometimes referred to as "polyiso") foam panels, expanded polystyrene foam panels, and extruded polystyrene foam panels. As will be appreciated, such foam panels have relatively low fastener pull-out strength as compared to wood panels, plywood panels, and OSBs. Accordingly, "foam panel" as used in this specification, is to be distinguished from wood panels, plywood panels, and OSBs, for example. As used herein, "foam" refers to a substance that is formed by trapping pockets of gas in a liquid or solid. In certain embodiments, the foams described in this specification are "closed-cell" foams. The term "closed-cell foam", as used in this specification, means that the foam has a closed cell content of at least 80%, sometimes at least 90%, when measured according to ASTM D6226-15, which is incorporated herein by reference. In certain embodiments, the foams described in this specification are "rigid" foams. The term "rigid foam" refers to a foam having a ratio of compressive strength to tensile strength of at least 0.5:1, elongation of less than 10%, and a low recovery rate from distortion and a low elastic limit, as described in "Polyurethanes: Chemistry and Technology, Part II Technology," J. H. Saunders & K. C. Frisch, Interscience Publishers, 1964, page 239, which is incorporated herein by reference. The term "panel", as used in this specification, refers to a solid, relatively thin and flat slab of material, which in some cases, has a rectangular or square shape. In some embodiments, the foam panels described herein have a thickness of no more than 2 inches (5.08 cm), such as a thickness of 1 to 2 inches (2.54 to 5.08 cm) or 1 to 1.5 inches (2.54 cm to 3.81 cm).

The foam panel 70 attached to the front frame surface 11a can comprise a facer material on the rear face and/or the front face of the foam. For example, the foam panel 70 may comprise a polyiso panel comprising a polyisocyanurate foam layer 75 and a facer material 77a/77b attached to a front face 75a and/or a rear face 75b of the polyisocyanurate foam layer 75. It is understood that a polyiso panel or other type of foam panel can comprise a facer material attached to just one face, either the front face or the rear face, of a polyisocyanurate foam layer or other core foam layer (e.g., expanded polystyrene or extruded polystyrene).

Polyiso panels and other types of foam panels generally comprise a facer material attached to and substantially covering both sides (the front and rear faces) of a polyisocyanurate foam layer or other core layer. For example, facer materials can comprise glass mats filled with recycled cardpanel and colored with carbon black. Facer materials can also comprise foil or foil/glass composites. Facer materials can also comprise fibrous materials such as fiberglass materials or other fiber-reinforced sheet-like materials. Examples of suitable facer materials include, but are not limited to, fiberglass mats, glass fiber-reinforced cellulosic felts, coated and polymer-bonded fiber mats (e.g., fibrous glass mats bonded with an organic polymer binder and coated with an organic polymer coating, clay, or other inorganic coating), foils (e.g., aluminum foil), coated foils, foil/membrane laminates, foil/glass composites, and polyolefin films (such as TYVEK® materials, available from DuPont; or TYPAR® materials, available from Fiberweb, Inc.). If a polyiso panel or other type of foam panel comprises facer materials on both the front and rear faces of the polyisocyanurate foam layer or other core layer, then the facer material on the front face may be the same as or may be different than the facer material on the rear face. The facer material should meet the requirements as described in ASTM D226/D226M—09: Standard Specification for Asphalt-Saturated Organic Felt Used in Roofing and Waterproofing; or ASTM E2556/E2556M—10: Standard Specification for Vapor Permeable Flexible Sheet Water-Resistive Barriers Intended for Mechanical Attachment; or otherwise qualify as a water-resistive barrier in accordance with International Residential Code (IRC) 703.2 (2012), which are each incorporated by reference into this specification. For embodiments in which the first foam panel comprises a polyiso panel, the foam panel may meet the requirements of ASTM C1289-15: Standard Specification for Faced Rigid Cellular Polyisocyanurate Thermal Insulation Panel, which is incorporated by reference into this specification.

Referring again to FIGS. 1 and 2, the foam panel 70 may be attached to the front frame surface 11a. The foam panel 70 can be attached to any of the front faces (12a, 14a, and/or 16a) of the constituent members (12, 14, and 16) of the frame 11. For example, the foam panel 70 can be attached to the front faces 12a and 14a of the first and second members 12 and 14 and to the front faces 16a of the connecting members 16 extending therebetween. The foam panel 70 can be attached to the front frame surface 11a with fasteners and/or an adhesive (not shown). Attachment fasteners can include, but are not limited to, nails, staples, screws, bolts, or rivets, or a combination of any thereof. Attachment adhesives can comprise a construction adhesive that is compatible with the adjoining materials. For example, an adhesive used to attach a foam panel to a frame can comprise a foam material (which may be the same foam material or a different foam material as the foam material comprising the foam layer, described below).

The foam panel 70, the first member 12, the second member 14, and the connecting members 16 define a cavity 18 within the frame 11. A foam layer 30 may be located within the cavity 18. The foam layer 30 adheres to the foam panel 70 and covers at least a portion of the rear surface 52b of the second foam panel 50.

The foam layer 30 can comprise, for example, polyurethane, polyurea, or polyisocyanurate, or a mixture thereof. The foam layer 30 can be substantially free, essentially free, or completely free of halogen-containing flame retardant additives.

Examples of foam materials include, but are not limited to, foams made with polyurethane, polyurea, polyisocyanurate (also referred to as polyiso), and mixtures thereof. Foam materials (including the foam layer 30) may be substantially free, may be essentially free, or may be completely free of halogen-containing flame retardant additives. The term "halogen" refers to the halogen elements, which include fluorine, chlorine, bromine, and iodine, and the term "halogen-containing flame retardant additives" refers to a substance that may be used to inhibit or resist the spread of fire, and which contains halogen groups such as a fluoro, chloro, bromo, and/or iodo groups. Further, the term "substantially free," as used in this specification, means the foam material contains less than 1000 parts per million (ppm), "essentially free" means less than 100 ppm, and "completely free" means less than 20 parts per billion (ppb) of halogen-containing flame retardant additives.

In certain embodiments, the foam layer 30 has a relatively high density. More particularly, in certain embodiments, the density of the foam layer 30 is at least 2.8 lb/ft$^3$ (44.9 kg/m$^3$), such as 2.8 to 4.0 lb/ft$^3$ (44.9 to 64.1 kg/m3), or, in some cases, 3.0 to 4.0 lb/ft$^3$ (48.1 to 64.1 kg/m$^3$) or 3.2 to 3.8 lb/ft$^3$ (51.3 to 60.9 kg/m$^3$) or 3.4 to 3.8 lb/ft$^3$ (54.5 to 60.9 kg/m$^3$), when measured according to ASTM D1622-08.

Referring to FIG. 2, in some embodiments the foam layer 30 comprises a thickness T extending from the rear surface 70b of the foam panel 70 to a position intermediate the front frame surface 11a and the rear frame surface 11b. In this manner, a gap G may be formed within the frame 11 between a rear surface 30b of the foam layer 30 and the rear frame surface 11b. Although FIG. 2 shows the foam layer 30 comprising a thickness T extending from the rear surface 70b of the first foam panel 70 to a position intermediate the front frame surface 11a and the rear frame surface 11b, it is understood that the foam layer 30 can alternatively comprise a thickness extending from the rear surface 70b of the first foam panel 70 to the rear frame surface 11b, in which case there may be no gap formed within the frame 11 between the rear surface 30b of the foam layer 30 and the rear frame surface 11b. In some embodiments, gap G has a width, from the rear surface of the foam layer 30b to the rear frame surface 11b, of at least 1 inch (2.54 cm), such as 1 to 2 inches (2.54 to 5.08 cm) or 1.5 to 2 inches (3.81 to 5.08 cm). In some embodiments, the foam layer 30 is disposed continuously along substantially the entire surface of first member 12, second member 14, and members 16 so as to, for example, be in the form of a "picture frame" within the cavity 18.

As indicated earlier, the modified wall structures of the present specification comprise a cured structural adhesive. As used herein, "structural adhesive" has the meaning set forth in ASTM D907-15, i.e., a bonding agent used for transferring required loads between adherends exposed to service environments typical for the structure involved. In some embodiments, as depicted in FIG. 1 for example, the cured structural adhesive 80 is disposed in an aperture located between the foam layer 30 and a frame member, such as the first member 12, the second member 14 or a connecting member 16, 17. In the embodiments illustrated in FIG. 1, for example, cured structural adhesive 80 is deposited in an aperture located between foam layer 30 and second member 14 and an aperture located between foam layer 30 and side member 16.

According to the modified wall structures of this specification, the cured structural adhesive is the cured product of a high solids-containing chemically-curing polymeric structural adhesive composition. As used herein, "high solids" refers to adhesive compositions having a nonvolatile content of at least 90% by weight, in some cases, at least 95% by weight or at least 99% by weight. As used herein the term "nonvolatile content" has the meaning set forth in ASTM D907-15, i.e., the percentage by weight of the nonvolatile matter in the adhesive composition.

Those skilled in the art will appreciate that the measured percentage of nonvolatile matter in an adhesive will vary according to the analytical procedure used. Standard test methods to be used vary depending on the type of adhesive being evaluated and include ASTM D1490-01 (2018) (Standard Test Method for Nonvolatile Content of Urea-Formaldehyde Resins Solutions), ASTM D1582-98 (2017) (Standard Test Method for Nonvolatile Content of Liquid Phenol, Resorcinol, and Melamine Adhesives), ASTM D4426-01 (2013) (Standard Test Method for Determination of Percent Nonvolatile Content of Liquid Phenolic Resins Used for Wood Laminating), and ASTM D1489-09 (2016) (Standard Test Method for Nonvolatile Content of Aqueous Adhesives).

As will be appreciated, therefore, the structural adhesive compositions of this specification will typically contain a low amount of volatile organic compounds ("VOCs"), i.e., organic compounds whose boiling point, at atmospheric pressure, is in the range from 50° C. to 100° C. By "low amount" is meant no more than 10% by weight, such as less than 5% by weight, or, in some cases, less than 1% by weight, such weight percents being based on the total weight of the structural adhesive composition.

As indicated, the structural adhesive compositions of this specification are "chemically-curing" polymeric structural adhesive compositions. As used herein, "chemically curing" means that the strength properties of the adhesive are developed via a chemical reaction, as described in ASTM D907-15. Various chemically-curing polymeric structural adhesive compositions are suitable for use in the modified wall structures of the present specification, examples of which include one- to two-component polyurethane based structural adhesives, including one-component moisture curing single component adhesive compositions comprising an isocyanate functional polyurethane prepolymer, single component moisture curing silicones, and two component epoxy resin based systems.

In some embodiments, the chemically-curing polymeric structural adhesive composition is embodied as a relatively thick pasty liquid having a viscosity, measured @ 75° F. (24° C.) of at least 200,000 cps, such as 200,000 to 800,000 cps, or 400,000 to 600,000 cps. See ASTM D1084-16, Method B.

Suitable high-solids chemically-curing polymeric structural adhesive compositions are commercially available and include, for example, Loctite® PL Premium® one component, polyurethane based, moisture-curing adhesive commercially available from Henkel Corporation, Rocky Hill, Conn., DAP® Dynagrip® Heavy Duty Max hybrid phthalate ester adhesive commercially available from DAP Products, Inc., Baltimore, Md., Quikrete® High Strength Anchoring Epoxy (a two-component epoxy) commercially available from The Quikrete Companies, LLC, Atlanta, Ga., and Gorilla Construction Adhesive, a one-component polyurethane prepolymer/methylene diphenyl diisocyanate ("MDI") based adhesive, commercially available from The Gorilla Glue Company, Cincinnati, Ohio.

Referring again to FIGS. 1 and 2, it can be seen that, in some embodiments of the wall structures of the present specification, the cured structural adhesive 80 is disposed in an aperture located between the foam layer 30 and a frame member, such as, in the cases of FIG. 2, second member 14, connecting member 16 and primary support member 17. It will be appreciated, however, that the aperture may be located between the foam layer 30 and any number of frame members, such as any one or more of first member 12, second member 14, connecting member 16 and primary support member 17. Moreover, in these embodiments, the aperture may extend to a depth that is the full depth of foam layer 30 (as is depicted in FIG. 2) or, alternatively, may extend only partially through the full depth of foam layer 30 so that some portion of foam layer 30 lies between the aperture and foam panel 70. In some embodiments, the depth of the foam layer 30 is 1 to 3 inches (2.54 to 7.62 centimeters), such as 1.5 to 2.0 inches (3.81 to 5.08 centimeters). Furthermore, in some cases, the aperture may extend along the entire length of a frame member, such as connecting member 16 or a primary support member 17. This may occur, for example, where the width of the wall structure needs to be reduced at the construction site due to the particular needs of the building design. In such a case, the wall structure may be cut along its height, a new frame member inserted at the desired wall width, and structural adhesive disposed in an aperture located between the newly inserted frame member and the foam layer. Similarly, the aperture could extend generally horizontally along a width of a cavity, such as where a cut out is made for placement of a window or door within the wall structure. In such a case, the wall structure may be cut horizontally, a new frame member inserted at the desired height within the wall structure, and structural adhesive disposed in an aperture located between the newly inserted horizontally positioned frame member and the foam layer. As will be appreciated, cured structural adhesive 80 may be disposed in one or more such apertures.

Figure 3:
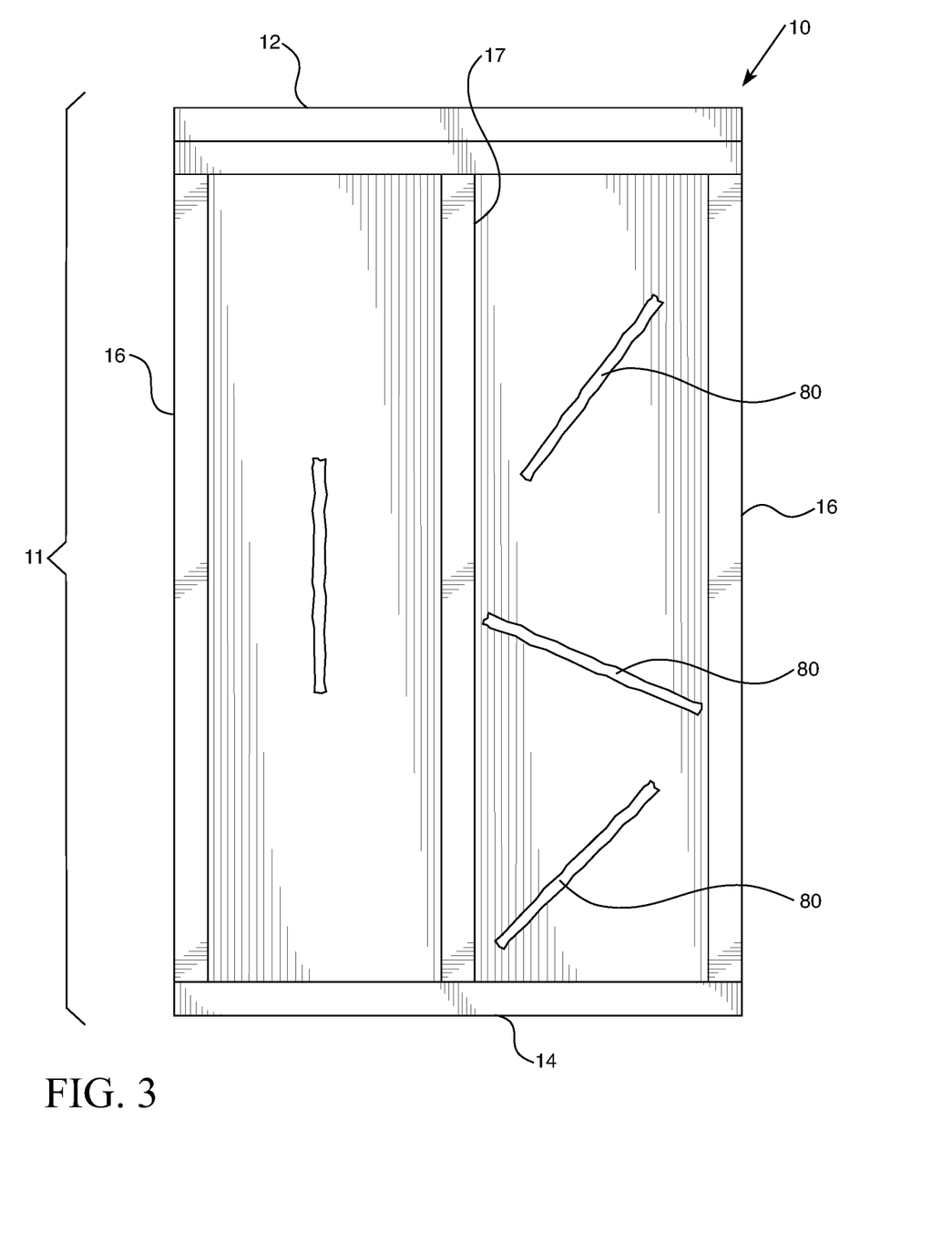
FIG. 3 is a rear view of a wall structure comprising a frame, a foam panel attached to the frame, a foam layer disposed within a cavity defined by the foam panel and the frame members, and a cured structural adhesive disposed in an aperture within the foam layer.
Figure 4:
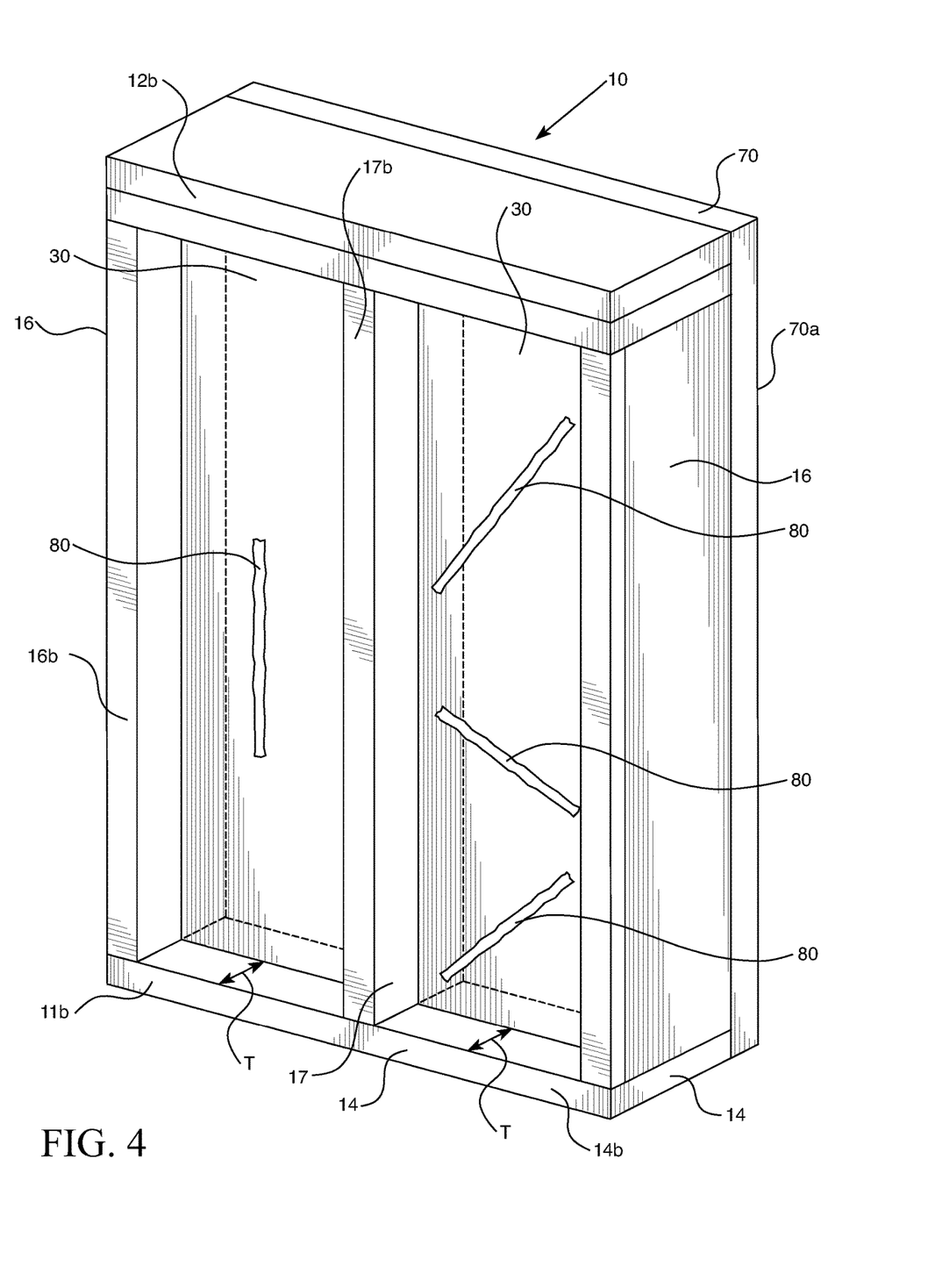
FIG. 4 is a rear perspective view of the wall structure shown in FIG. 3.

In addition to or in lieu of having a cured structural adhesive disposed in an aperture located between the foam layer and a frame member, as is illustrated in FIGS. 1 and 2, in some embodiments of the wall structure of the present specification, a cured structural adhesive 80 is disposed in an aperture located within foam layer 30 such as is illustrated in FIGS. 3 and 4. As with the prior embodiment, the aperture may extend to a depth that is the full depth of foam layer 30 (as is depicted in FIG. 4) or, alternatively, may extend only partially through the full depth of foam layer 30 so that some portion of foam layer 30 lies between the aperture and foam panel 70. In some embodiments, the depth of the foam layer 30 is 1 to 3 inches (2.54 to 7.62 centimeters), such as 1.5 to 2.0 inches (3.81 to 5.08 centimeters). As will be appreciated, cured structural adhesive 80 may be disposed in one or more such apertures.

In either of the previous embodiments, there may be any number of apertures in which structural adhesive 80 is disposed, in any of a variety of width, depths and lengths, such as is depicted in FIGS. 3 and 4. In some cases, however, the width of the aperture is no more than 1 inch (2.54 centimeters), no more than 0.5 inch (1.27 centimeters), or, in some cases, no more than 0.25 inch (0.64 centimeter).

Because of the potential depth of the aperture, the structural adhesive composition should be selected so as to be capable of curing throughout the thickness of the adhesive layer in a reasonable period of time, i.e., within no more than 48 hours, in some cases, within 24 hours. In some embodiments, the thickness of the adhesive layer is 1 to 3 inches (2.54 to 7.62 centimeters), such as 1.5 to 2.0 inches (3.81 to 5.08 centimeters). As used in this context, "cure" means that the adhesive composition has chemically reacted to an extent sufficient to return the racking strength of the wall structure to an amount that is at least within 10% of the racking strength (measured according to ASTM E72-15) of the wall structure without any of the apertures described herein in which the structural adhesive is disposed.

Figure 5:
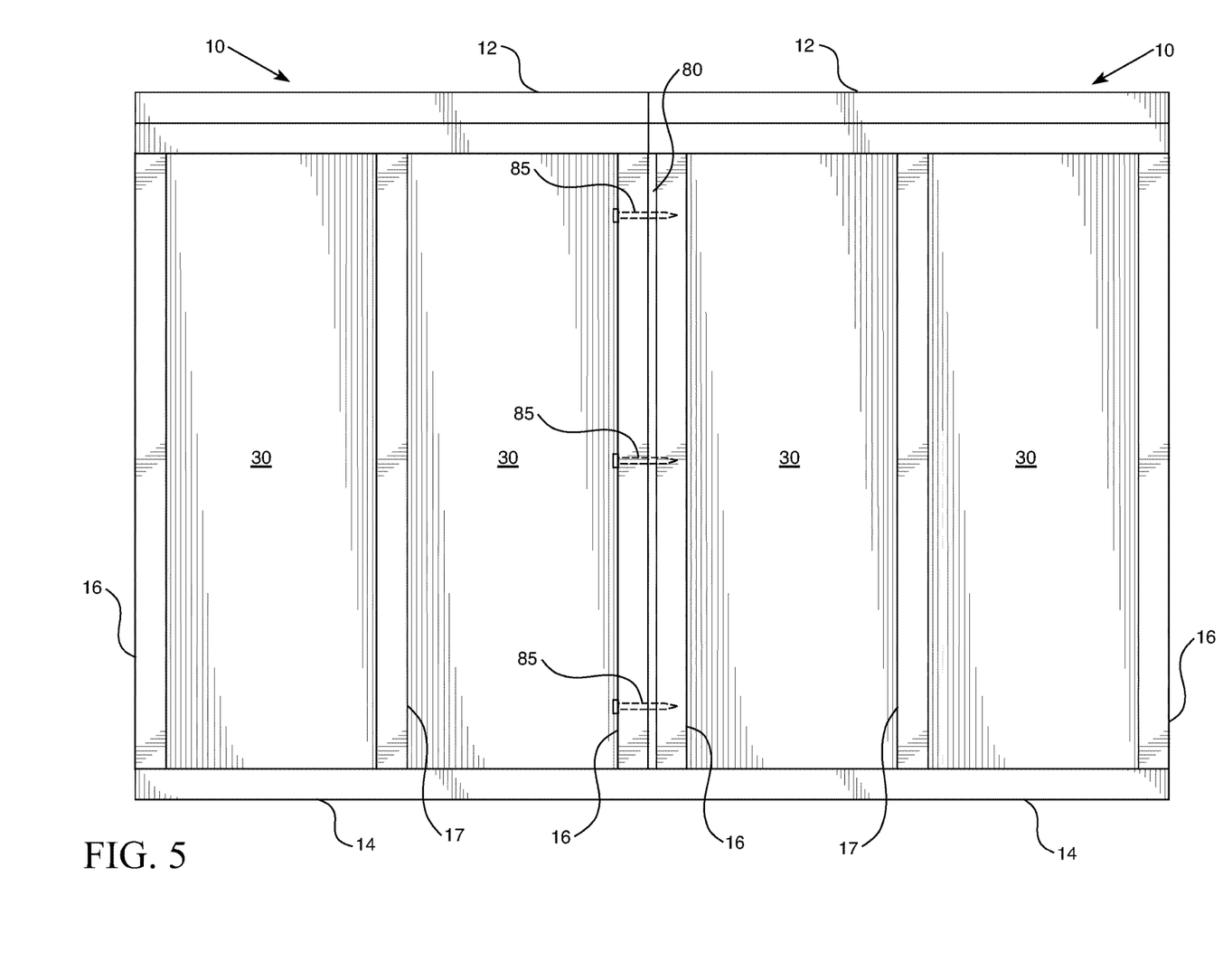
FIG. 5 is a rear view of a connected foam wall structure, each foam wall structure comprising a frame, a foam panel attached to the frame, a foam layer disposed within a cavity defined by adjacent frame members, and a cured structural adhesive disposed in between adjacent frame members.

Turning now to FIG. 5, it is seen that, in some embodiments of the present specification, the structural adhesive composition described above 80 may be deposited in an aperture that may exist between connecting members 16 of adjacent foam wall structures 10. Here, a a connected foam wall structure is illustrated, in which each foam wall structure 10 a cured structural adhesive 80 disposed in between adjacent connecting members 16. This technique can be used to join two adjacent foam wall structures as the building is being constructed, such as where the ends of the one foam wall structure that would be in contact with the next foam wall structure are not straight, such as when they are bowed or twisted or otherwise misshapen such that the frame foam wall structures do not meet together all the way down the length thereof and require that the gap therebetween to be are nailed and glued together to seal the edges. As such, in some embodiments, in addition to structural adhesive 80, mechanical fasteners 85 may also be used to connect adjacent connecting members 16, as illustrated in FIG. 5.

The modified and connected foam wall structures can have a wall racking at least comparable to unmodified foam wall structures of similar design, as well as, in the case of connected wall structures, racking strengths at least as high has the racking strength of connected wall structure in which frame members are straight, such as when they are not bowed or twisted or otherwise misshapen such that the frame foam wall structures do meet together all the way down the length thereof and do not have a gap therebetween.

The wall structures described in this specification can also improve the consistency of installed insulation, and make it easy to install electrical and plumbing components, including components connected to exterior fixtures. The wall structures described in this specification can be used in new building construction or in retrofit or repair applications. Various aspects of the subject matter described herein are set out in the following numbered clause:

Clause 1. A foam wall structure comprising: (a) frame members comprising: (i) a first member; (ii) a second member spaced apart from the first member; and (iii) connecting members extending between the first member and the second member, wherein the first member, the second member, and the connecting members each comprise a front surface and a rear surface that form a front frame surface and a rear frame surface; (b) a foam panel attached to the front frame surface, wherein: (i) the foam panel overlies the front frame surface; and (ii) the foam panel, the first member, the second member, and the connecting members define a cavity; (c) a foam layer disposed within the cavity and adhered to the foam panel, and (d) a cured structural adhesive disposed in at least one of (A) an aperture located within the foam layer, and (B) an aperture located between the foam layer and a frame member, wherein the cured structural adhesive is the cured product of a high solids-containing chemically-curing polymeric structural adhesive composition.

Clause 2. The foam wall structure of clause 1, wherein the foam panel polyisocyanurate foam. expanded polystyrene foam, or extruded polystyrene foam.

Clause 3. The foam wall structure of clause 1 or clause 2, wherein the foam panel and the foam layer comprise closed-cell foam.

Clause 4. The foam wall structure of one of clause 1 to clause 3, wherein the foam panel and the foam layer comprise a rigid foam.

Clause 5. The foam wall structure of one of clause 1 to clause 4, wherein the foam panel has a thickness of no more than 2 inches (5.08 cm), such as a thickness of 1 to 2 inches (2.54 to 5.08 cm) or 1 to 1.5 inches (2.54 cm to 3.81 cm).

Clause 6. The foam wall structure of one of clause 1 to clause 5, wherein the foam panel comprises a facer material on the rear face and/or the front face of the foam.

Clause 7. The foam wall structure of clause 6, wherein the facer material comprises glass mat filled with recycled cardpanel and colored with carbon black, a foil or foil and glass composite, a fiberglass material or other fiber-reinforced sheet-like materials, a fiberglass mat, a glass fiber-reinforced cellulosic felt, a coated and polymer-bonded fiber mat (e.g., a fibrous glass mat bonded with an organic polymer binder and coated with an organic polymer coating, clay, or other inorganic coating), a foil (e.g., aluminum foil), a coated foil, a foil and membrane laminate, a foil and glass composite, or a polyolefin film.

Clause 8. The foam wall structure of one of clause 1 to clause 7, wherein the foam panel is attached to the front frame surface with mechanical fasteners (such as nails, scrails, staples, screws, bolts, or rivets, or a combination of any thereof) and/or an adhesive (such as construction adhesive, such as a foam material which may be the same foam material or a different foam material as the foam material comprising the foam layer.

Clause 9. The foam wall structure of one of clause 1 to clause 8, wherein the foam layer comprises polyurethane, polyurea, or polyisocyanurate, or a mixture thereof, which, in some cases, is substantially free, essentially free, or completely free of halogen-containing flame retardant additives.

Clause 10. The foam wall structure of one of clause 1 to clause 9, wherein the density of the foam layer is at least 2.8 lb/ft$^3$ (44.9 kg/m$^3$), such as 2.8 to 4.0 lb/ft$^3$ (44.9 to 64.1 kg/m3), or, in some cases, 3.0 to 4.0 lb/ft$^3$ (48.1 to 64.1 kg/m$^3$) or 3.2 to 3.8 lb/ft$^3$ (51.3 to 60.9 kg/m$^3$) or 3.4 to 3.8 lb/ft$^3$ (54.5 to 60.9 kg/m$^3$), when measured according to ASTM D1622-08.

Clause 11. The foam wall structure of one of clause 1 to clause 10, wherein the foam layer comprises a thickness extending from the rear surface of the foam panel to a position intermediate the front frame surface and the rear frame surface so that a gap is formed within the frame between a rear surface of the foam layer and the rear frame surface, such as where the gap has a width from the rear surface of the foam layer to the rear frame surface of at least 1 inch (2.54 cm), such as 1 to 2 inches (2.54 to 5.08 cm) or 1.5 to 2 inches (3.81 to 5.08 cm).

Clause 12. The foam wall structure of one of clause 1 to clause 11, wherein the cured structural adhesive is the cured product of a high solids-containing chemically-curing polymeric structural adhesive composition having a nonvolatile content of at least 90% by weight, in some cases, at least 95% by weight or at least 99% by weight.

Clause 13. The foam wall structure of one of clause 1 to clause 12, wherein the structural adhesive composition has a VOC content of no more than 10% by weight, such as less than 5% by weight, or, in some cases, less than 1% by weight, such weight percents being based on the total weight of the structural adhesive composition.

Clause 14. The foam wall structure of one of clause 1 to clause 13, wherein the chemically-curing polymeric structural adhesive composition comprises a one- or two-component polyurethane based structural adhesive, such as a one-component moisture curing single component adhesive composition comprising an isocyanate functional polyurethane prepolymer, a single component moisture curing silicone, or a two component epoxy resin based system.

Clause 15. The foam wall structure of one of clause 1 to clause 14, wherein the chemically-curing polymeric structural adhesive composition has a viscosity, measured @ 75° F. (24° C.) of at least 200,000 cps, such as 200,000 to 800,000 cps, or 400,000 to 600,000 cps.

Clause 16. The foam wall structure of one of clause 1 to clause 15, wherein the depth of the foam layer is 1 to 3 inches (2.54 to 7.62 centimeters), such as 1.5 to 2.0 inches (3.81 to 5.08 centimeters).

Clause 17. The foam wall structure of one of clause 1 to clause 16, wherein the width of the aperture is no more than 1 inch (2.54 centimeters), no more than 0.5 inch (1.27 centimeters), or, in some cases, no more than 0.25 inch (0.64 centimeter).

Clause 18. The foam wall structure of one of clause 1 to clause 17, wherein the structural adhesive composition is capable of curing throughout the thickness of the adhesive layer in no more than 48 hours, in some cases, within 24 hours even when the thickness of the adhesive layer is 1 to 3 inches (2.54 to 7.62 centimeters), such as 1.5 to 2.0 inches (3.81 to 5.08 centimeters).

Clause 19. A method for modifying a foam wall structure comprising: (a) frame members comprising: (i) a first member; (ii) a second member spaced apart from the first member; and (iii) connecting members extending between the first member and the second member, wherein the first member, the second member, and the connecting members each comprise a front surface and a rear surface that form a front frame surface and a rear frame surface; (b) a foam panel attached to the front frame surface, wherein: (i) the foam panel overlies the front frame surface; and (ii) the foam panel, the first member, the second member, and the connecting members define a cavity; and (c) a foam layer disposed within the cavity and adhered to the foam panel, the method comprising depositing a high solids-containing chemically-curing polymeric structural adhesive composition into at least one of (A) an aperture located within the foam layer, and (B) an aperture located between the foam layer and a frame member.

Clause 20. The method of clause 19, wherein the foam panel polyisocyanurate foam. expanded polystyrene foam, or extruded polystyrene foam.

Clause 21. The method of clause 19 or clause 20, wherein the foam panel and the foam layer comprise closed-cell foam.

Clause 22. The method of one of clause 19 to clause 21, wherein the foam panel and the foam layer comprise a rigid foam.

Clause 23. The method of one of clause 19 to clause 22, wherein the foam panel has a thickness of no more than 2 inches (5.08 cm), such as 1 to 2 inches (2.54 to 5.08 cm) or 1 to 1.5 inches (2.54 cm to 3.81 cm).

Clause 24. The method of one of clause 19 to clause 23, wherein the foam panel comprises a facer material on the rear face and/or the front face of the foam.

Clause 25. The method of clause 24, wherein the facer material comprises glass mat filled with recycled cardpanel and colored with carbon black, a foil or foil and glass composite, a fiberglass material or other fiber-reinforced sheet-like materials, a fiberglass mat, a glass fiber-reinforced cellulosic felt, a coated and polymer-bonded fiber mat (e.g., a fibrous glass mat bonded with an organic polymer binder and coated with an organic polymer coating, clay, or other inorganic coating), a foil (e.g., aluminum foil), a coated foil, a foil and membrane laminate, a foil and glass composite, or a polyolefin film.

Clause 26. The method of one of clause 19 to clause 25, wherein the foam panel is attached to the front frame surface with mechanical fasteners (such as nails, scrails, staples, screws, bolts, or rivets, or a combination of any thereof) and/or an adhesive (such as construction adhesive, such as a foam material which may be the same foam material or a different foam material as the foam material comprising the foam layer.

Clause 27. The method of one of clause 19 to clause 26, wherein the foam layer comprises polyurethane, polyurea, or polyisocyanurate, or a mixture thereof, which, in some cases, is substantially free, essentially free, or completely free of halogen-containing flame retardant additives.

Clause 28. The method of one of clause 19 to clause 27, wherein the density of the foam layer is at least 2.8 lb/ft3 (44.9 kg/m3), such as 2.8 to 4.0 lb/ft3 (44.9 to 64.1 kg/m3), or, in some cases, 3.0 to 4.0 lb/ft3 (48.1 to 64.1 kg/m3) or 3.2 to 3.8 lb/ft3 (51.3 to 60.9 kg/m3) or 3.4 to 3.8 lb/ft3 (54.5 to 60.9 kg/m3), when measured according to ASTM D1622-08.

Clause 29. The method of one of clause 19 to clause 28, wherein the foam layer comprises a thickness extending from the rear surface of the foam panel to a position intermediate the front frame surface and the rear frame surface so that a gap is formed within the frame between a rear surface of the foam layer and the rear frame surface, such as where the gap has a width from the rear surface of the foam layer to the rear frame surface of at least 1 inch (2.54 cm), such as 1 to 2 inches (2.54 to 5.08 cm) or 1.5 to 2 inches (3.81 to 5.08 cm).

Clause 30. The method of one of clause 19 to clause 29, wherein the high solids-containing chemically-curing polymeric structural adhesive composition having a nonvolatile content of at least 90% by weight, in some cases, at least 95% by weight or at least 99% by weight.

Clause 31. The method of one of clause 19 to clause 30, wherein the structural adhesive composition has a VOC content of no more than 10% by weight, such as less than 5% by weight, or, in some cases, less than 1% by weight, such weight percents being based on the total weight of the structural adhesive composition.

Clause 32. The method of one of clause 19 to clause 31, wherein the chemically-curing polymeric structural adhesive composition comprises a one- or two-component polyurethane based structural adhesive, such as a one-component moisture curing single component adhesive composition comprising an isocyanate functional polyurethane prepolymer, a single component moisture curing silicone, or a two component epoxy resin based system.

Clause 33. The method of one of clause 19 to clause 32, wherein the chemically-curing polymeric structural adhesive composition has a viscosity, measured @ 75° F. (24° C.) of at least 200,000 cps, such as 200,000 to 800,000 cps, or 400,000 to 600,000 cps.

Clause 34. The method of one of clause 19 to clause 33, wherein the depth of the foam layer is 1 to 3 inches (2.54 to 7.62 centimeters), such as 1.5 to 2.0 inches (3.81 to 5.08 centimeters).

Clause 35. The method of one of clause 19 to clause 34, wherein the width of the aperture is no more than 1 inch (2.54 centimeters), no more than 0.5 inch (1.27 centimeters), or, in some cases, no more than 0.25 inch (0.64 centimeter).

Clause 36. The method of one of clause 19 to clause 35, wherein the structural adhesive composition is capable of curing throughout the thickness of the adhesive layer in no more than 48 hours, in some cases, within 24 hours even when the thickness of the adhesive layer is 1 to 3 inches (2.54 to 7.62 centimeters), such as 1.5 to 2.0 inches (3.81 to 5.08 centimeters).

Clause 37. Adjacent foam wall structures, in which the foam wall structures each comprise: (a) frame members comprising: (i) a first member; (ii) a second member spaced apart from the first member; and (iii) connecting members extending between the first member and the second member, wherein the first member, the second member, and the connecting members each comprise a front surface and a rear surface that form a front frame surface and a rear frame surface; (b) a foam panel attached to the front frame surface, wherein: (i) the foam panel overlies the front frame surface; and (ii) the foam panel, the first member, the second member, and the connecting members define a cavity; and (c) a foam layer disposed within the cavity, wherein the foam layer adheres to the foam panel, wherein the adjacent foam wall structures comprise a cured structural adhesive located between connecting members of the adjacent foam wall structures and which is the cured product of a high solids-containing chemically-curing polymeric structural adhesive composition.

Clause 38. The adjacent foam wall structures of clause 37, wherein the foam panel polyisocyanurate foam. expanded polystyrene foam, or extruded polystyrene foam.

Clause 39. The adjacent foam wall structures of clause 37 or clause 38, wherein the foam panel and the foam layer comprise closed-cell foam.

Clause 40. The adjacent foam wall structures of one of clause 37 to clause 39, wherein the foam panel and the foam layer comprise a rigid foam.

Clause 41. The adjacent foam wall structures of one of clause 37 to clause 40, wherein the foam panel has a thickness of no more than 2 inches (5.08 cm), such as a thickness of 1 to 2 inches (2.54 to 5.08 cm) or 1 to 1.5 inches (2.54 cm to 3.81 cm).

Clause 42. The adjacent foam wall structures of one of clause 37 to clause 41, wherein the foam panel comprises a facer material on the rear face and/or the front face of the foam.

Clause 43. The adjacent foam wall structures of clause 42, wherein the facer material comprises glass mat filled with recycled cardpanel and colored with carbon black, a foil or foil and glass composite, a fiberglass material or other fiber-reinforced sheet-like materials, a fiberglass mat, a glass fiber-reinforced cellulosic felt, a coated and polymer-bonded fiber mat (e.g., a fibrous glass mat bonded with an organic polymer binder and coated with an organic polymer coating, clay, or other inorganic coating), a foil (e.g., aluminum foil), a coated foil, a foil and membrane laminate, a foil and glass composite, or a polyolefin film.

Clause 44. The adjacent foam wall structures of one of clause 37 to clause 43, wherein the foam panel is attached to the front frame surface with mechanical fasteners (such as nails, scrails, staples, screws, bolts, or rivets, or a combination of any thereof) and/or an adhesive (such as construction adhesive, such as a foam material which may be the same foam material or a different foam material as the foam material comprising the foam layer.

Clause 45. The adjacent foam wall structures of one of clause 37 to clause 44, wherein the foam layer comprises polyurethane, polyurea, or polyisocyanurate, or a mixture thereof, which, in some cases, is substantially free, essentially free, or completely free of halogen-containing flame retardant additives.

Clause 46. The adjacent foam wall structures of one of clause 37 to clause 45, wherein the density of the foam layer is at least 2.8 lb/ft$^3$ (44.9 kg/m$^3$), such as 2.8 to 4.0 lb/ft$^3$ (44.9 to 64.1 kg/m3), or, in some cases, 3.0 to 4.0 lb/ft$^3$ (48.1 to 64.1 kg/m$^3$) or 3.2 to 3.8 lb/ft$^3$ (51.3 to 60.9 kg/m$^3$) or 3.4 to 3.8 lb/ft$^3$ (54.5 to 60.9 kg/m$^3$), when measured according to ASTM D1622-08.

Clause 47. The adjacent foam wall structures of one of clause 37 to clause 46, wherein the foam layer comprises a thickness extending from the rear surface of the foam panel to a position intermediate the front frame surface and the rear frame surface so that a gap is formed within the frame between a rear surface of the foam layer and the rear frame surface, such as where the gap has a width from the rear surface of the foam layer to the rear frame surface of at least 1 inch (2.54 cm), such as 1 to 2 inches (2.54 to 5.08 cm) or 1.5 to 2 inches (3.81 to 5.08 cm).

Clause 48. The adjacent foam wall structures of one of clause 37 to clause 47, wherein the cured structural adhesive is the cured product of a high solids-containing chemically-curing polymeric structural adhesive composition having a nonvolatile content of at least 90% by weight, in some cases, at least 95% by weight or at least 99% by weight.

Clause 49. The adjacent foam wall structures of one of clause 37 to clause 48, wherein the structural adhesive composition has a VOC content of no more than 10% by weight, such as less than 5% by weight, or, in some cases, less than 1% by weight, such weight percents being based on the total weight of the structural adhesive composition.

Clause 50. The adjacent foam wall structures of one of clause 37 to clause 49, wherein the chemically-curing polymeric structural adhesive composition comprises a one- or two-component polyurethane based structural adhesive, such as a one-component moisture curing single component adhesive composition comprising an isocyanate functional polyurethane prepolymer, a single component moisture curing silicone, or a two component epoxy resin based system.

Clause 51. The adjacent foam wall structures of one of clause 37 to clause 50, wherein the chemically-curing polymeric structural adhesive composition has a viscosity, measured @ 75° F. (24° C.) of at least 200,000 cps, such as 200,000 to 800,000 cps, or 400,000 to 600,000 cps.

Clause 52. The adjacent foam wall structures of one of clause 37 to clause 51, wherein the depth of the foam layer is 1 to 3 inches (2.54 to 7.62 centimeters), such as 1.5 to 2.0 inches (3.81 to 5.08 centimeters).

Clause 53. The adjacent foam wall structure of one of clause 37 to clause 52, further comprising mechanical fastener connecting adjacent connecting members.

Clause 54. A method of joining adjacent foam wall structures, each foam wall structure comprising: (a) frame members comprising: (i) a first member; (ii) a second member spaced apart from the first member; and (iii) connecting members extending between the first member and the second member, wherein the first member, the second member, and the connecting members each comprise a front surface and a rear surface that form a front frame surface and a rear frame surface; (b) a foam panel attached to the front frame surface, wherein: (i) the foam panel overlies the front frame surface; and (ii) the foam panel, the first member, the second member, and the connecting members define a cavity; and (c) a foam layer disposed within the cavity and adhered to the foam panel, the method comprising depositing a high solids-containing chemically-curing polymeric structural adhesive composition between connecting members of the adjacent foam wall structures.

Clause 55. The method of clause 54, wherein the foam panel polyisocyanurate foam. expanded polystyrene foam, or extruded polystyrene foam.

Clause 56. The method of clause 54 or clause 55, wherein the foam panel and the foam layer comprise closed-cell foam.

Clause 57. The method of one of clause 54 to clause 56, wherein the foam panel and the foam layer comprise a rigid foam.

Clause 58. The method of one of clause 54 to clause 57, wherein the foam panel has a thickness of no more than 2 inches (5.08 cm), such as a thickness of 1 to 2 inches (2.54 to 5.08 cm) or 1 to 1.5 inches (2.54 cm to 3.81 cm).

Clause 59. The method of one of clause 54 to clause 58, wherein the foam panel comprises a facer material on the rear face and/or the front face of the foam.

Clause 60. The method of clause 59, wherein the facer material comprises glass mat filled with recycled cardpanel and colored with carbon black, a foil or foil and glass composite, a fiberglass material or other fiber-reinforced sheet-like materials, a fiberglass mat, a glass fiber-reinforced cellulosic felt, a coated and polymer-bonded fiber mat (e.g., a fibrous glass mat bonded with an organic polymer binder and coated with an organic polymer coating, clay, or other inorganic coating), a foil (e.g., aluminum foil), a coated foil, a foil and membrane laminate, a foil and glass composite, or a polyolefin film.

Clause 61. The method of one of clause 54 to clause 60, wherein the foam panel is attached to the front frame surface with mechanical fasteners (such as nails, scrails, staples, screws, bolts, or rivets, or a combination of any thereof) and/or an adhesive (such as construction adhesive, such as a foam material which may be the same foam material or a different foam material as the foam material comprising the foam layer.

Clause 62. The method of one of clause 54 to clause 61, wherein the foam layer comprises polyurethane, polyurea, or polyisocyanurate, or a mixture thereof, which, in some cases, is substantially free, essentially free, or completely free of halogen-containing flame retardant additives.

Clause 63. The method of one of clause 54 to clause 62, wherein the density of the foam layer is at least 2.8 lb/ft$^3$ (44.9 kg/m$^3$), such as 2.8 to 4.0 lb/ft$^3$ (44.9 to 64.1 kg/m3), or, in some cases, 3.0 to 4.0 lb/ft$^3$ (48.1 to 64.1 kg/m$^3$) or 3.2 to 3.8 lb/ft$^3$ (51.3 to 60.9 kg/m$^3$) or 3.4 to 3.8 lb/ft$^3$ (54.5 to 60.9 kg/m$^3$), when measured according to ASTM D1622-08.

Clause 64. The method of one of clause 54 to clause 63, wherein the foam layer comprises a thickness extending from the rear surface of the foam panel to a position intermediate the front frame surface and the rear frame surface so that a gap is formed within the frame between a rear surface of the foam layer and the rear frame surface, such as where the gap has a width from the rear surface of the foam layer to the rear frame surface of at least 1 inch (2.54 cm), such as 1 to 2 inches (2.54 to 5.08 cm) or 1.5 to 2 inches (3.81 to 5.08 cm).

Clause 65. The method of one of clause 54 to clause 64, wherein the high solids-containing chemically-curing polymeric structural adhesive composition has a nonvolatile content of at least 90% by weight, in some cases, at least 95% by weight or at least 99% by weight.

Clause 66. The method of one of clause 54 to clause 65, wherein the structural adhesive composition has a VOC content of no more than 10% by weight, such as less than 5% by weight, or, in some cases, less than 1% by weight, such weight percents being based on the total weight of the structural adhesive composition.

Clause 67. The method of one of clause 54 to clause 66, wherein the chemically-curing polymeric structural adhesive composition comprises a one- or two-component polyurethane based structural adhesive, such as a one-component moisture curing single component adhesive composition comprising an isocyanate functional polyurethane prepolymer, a single component moisture curing silicone, or a two component epoxy resin based system.

Clause 68. The method of one of clause 54 to clause 67, wherein the chemically-curing polymeric structural adhesive composition has a viscosity, measured @ 75° F. (24° C.) of at least 200,000 cps, such as 200,000 to 800,000 cps, or 400,000 to 600,000 cps.

Clause 69. The method of one of clause 54 to clause 68, wherein the depth of the foam layer is 1 to 3 inches (2.54 to 7.62 centimeters), such as 1.5 to 2.0 inches (3.81 to 5.08 centimeters).

Clause 70. The method of one of clause 54 to clause 69, further comprising connecting adjacent connecting members with mechanical fasteners.

The non-limiting and non-exhaustive examples that follow are intended to further describe various non-limiting and non-exhaustive embodiments without restricting the scope of the embodiments described in this specification.

EXAMPLES

Examples 1-7

2×4 inch studded 24 inch on center (OC) 4 foot×8 foot wall panels were backed with a 1 inch thick polyisocyanurate (polyiso) rigid wall insulation panel having a closed cell polyisocyanurate foam core, faced with a coated glass-mat facer on both sides available from Hunter Panels, Portland, Me., as Hunter Xci CG. A polyurethane spray foam (Bayseal® CC STR, commercially available from Accella™ Performance Materials Inc.) was sprayed applied into the stud cavity, such that a continuous layer of spray foam filled the entire cavity in a nominal spray foam thickness of 1½ inches. The wall panels were allowed to cure for at least 24 hours after the spray foam application and before further testing.

In order to test the adhesive strength of the subject adhesive the wall panel had a ½ inch area of spray foam routed out of the panel. The area routed out is generally depicted by FIG. 1 and FIG. 2 as area 80. The length of the routed area was 2 feet on the vertical direction and the width of the cavity in the horizontal direction. This area was chosen as it will be transparent to users familiar with the ASTM E72-15 test procedures that typically the area that was routed out is the area that fails first under the ASTM E 72 test protocol. The routed area was filled with the test adhesive and the adhesive allowed to cure for 24-48 hours before testing. Adhesives were assessed for their cure performance and candidates that were not hardened after 48 hours were eliminated from the testing protocol. The eliminated adhesive was Loctite PL 300 Foamboard. The resulting walls were tested according to ASTM E72-15 and pushed to failure at the standard testing force rate found in ASTM E72-15. Results are set forth in the following

TABLE

| Example | | p/lft | For 4 ft. wall (Pounds) | For 4 ft. wall (Newtons) |
|---|---|---|---|---|
| | Adhesive used in routed area | | | |
| 1 | Gorilla Construction Adhesive | 487 | 1,948 | 8,665 |
| 2 | Dyna Grip Heavy Duty Max | 469 | 1,876 | 8,345 |
| 3 | Loctite PL 3X Premium | 506 | 2,024 | 9,003 |
| 4 | Quikrite High Strength Anchoring Epoxy | 499 | 1,996 | 8,879 |
| | Comparative Walls | | | |
| 5 | Wall not routed out | 504 | 2,016 | 8,968 |
| 6 | Wall routed, no adhesive added. | 346 | 1,384 | 6,156 |
| 7 | APA Wall made with OSB, wall not routed | 484 | 1,936 | 8,612 | p/lft pounds per linear foot

As is apparent, Examples 1~4 exhibited a similar ultimate strength as Comparison Example 5. For clarity, the Comparison Example 5 was the wall built as described in the detailed description, and then tested according to ASTM E 72-15, without the routing and adhesive addition applied to that Example. Comparative Example 6 was produced as described including having the routing as described, but without any adhesive added and was tested without any further treatment. Example 7 was a standard APA ("American Panel Association") wall built using 2×4 Studs and Oriented Strand board ("OSB") as sheathing. In Example 7, the OSB was nailed to the studs using 16d nails spaced at 6 inch intervals according to the APA Standard procedure. This wall was not routed. As can also be seen, Examples 1-4 showed a similar ultimate strength as the OSB standard wall as shown in Comparison Example 7. Therefore, these results show that walls built as described and treated in the fashion of the Inventive Examples produced walls that exhibit ultimate strength comparable to both the OSB standard wall and also the wall without the routing and adhesive treatment.

Example 8

Two 2×4 inch studded 24 inch on center (OC) 4 foot×8 foot wall structures were backed with a 1 inch thick polyisocyanurate (polyiso) rigid wall insulation panel having a closed cell polyisocyanurate foam core, faced with a coated glass-mat facer on both sides available from Hunter Panels, Portland, Me., as Hunter Xci CG. A polyurethane spray foam (Bayseal® CC STR, commercially available from Accella™ Performance Materials Inc.) was sprayed applied into the stud cavity, such that a continuous layer of spray foam filled the entire cavity in a nominal spray foam thickness of 1½ inches. The wall structures were allowed to cure for at least 24 hours after the spray foam application and before further testing. The two structures were joined together with nails, nails inserted down the length of the joined structures approximately every 9-12 inches. To induce a gap between the wall structures an edge had a spacer introduced at several points down the length of the structure to structure joint so as to form a V shaped gap between the wall structures. The "V" shape was approximately ¼ of an inch at the top of the V at surface 16b and the gap reduced towards surface 16a. The test adhesive (Loctite PL 3x Premium) was applied within the V shaped gap between the structures 10 in FIG. 5 and allowed to cure. The 8×8 foot structure produced by adhering the two 4 ft by 8 ft structures together was tested according to ASTM E 72-15. The ultimate strength was found to be 565 pounds/linear foot. The joined structures therefore compared favorably with the Comparison Example 5 and the OSB standard wall Example 7 that exhibit ultimate strength of 504 p/lf and 484 p/lft respectively.

This Example illustrates that the technique described above can be used to join adjacent foam wall structures to seal the wall structure to wall structure joints and to form an air and vapor barrier at that joint. This technique can be particularly useful where the end studs of either or both of the connecting wall structures are not straight, such as when they are bowed or twisted or otherwise misshapen such that the frame of the foam wall structures do not meet together all the way down the length thereof and require that the gap therebetween to be nailed and glued together to seal the edges.

Various features and characteristics of the inventions are described in this specification to provide an overall understanding of the disclosed wall structures and method of manufacture. It is understood that the various features and characteristics described in this specification can be combined in any suitable manner regardless of whether such features and characteristics are expressly described in combination in this specification. The Applicant expressly intends such combinations of features and characteristics to be included within the scope of this specification. As such, the claims can be amended to recite, in any combination, any features and characteristics expressly or inherently described in, or otherwise expressly or inherently supported by, this specification. Furthermore, the Applicant reserves the right to amend the claims to affirmatively disclaim features and characteristics that may be present in the prior art, even if those features and characteristics are not expressly described in this specification. Therefore, any such amendments will not add new matter to the specification or claims, and will comply with written description and sufficiency of description requirements (e.g., 35 U.S.C. § 112(a) and Article 123(2) EPC). The wall structures and methods disclosed in this specification can comprise, consist of, or consist essentially of the various features and characteristics described in this specification.

Also, any numerical range recited in this specification describes all sub-ranges of the same numerical precision (i.e., having the same number of specified digits) subsumed within the recited range. For example, a recited range of "1.0 to 10.0" describes all sub-ranges between (and including) the recited minimum value of 1.0 and the recited maximum value of 10.0, such as, for example, "2.4 to 7.6," even if the range of "2.4 to 7.6" is not expressly recited in the text of the specification. Accordingly, the Applicant reserves the right to amend this specification, including the claims, to expressly recite any sub-range of the same numerical precision subsumed within the ranges expressly recited in this specification. All such ranges are inherently described in this specification such that amending to expressly recite any such sub-ranges will not add new matter to the specification or claims, and will comply with written description and sufficiency of description requirements (e.g., 35 U.S.C. §§ 112(a) and Article 123(2) EPC). Additionally, numerical parameters described in this specification should be construed in light of the number of reported significant digits, the numerical precision of the number, and by applying ordinary rounding techniques. It is also understood that numerical parameters described in this specification will necessarily possess the inherent variability characteristic of the underlying measurement techniques used to determine the numerical value of the parameter.

The grammatical articles "one", "a", "an", and "the", as used in this specification, are intended to include "at least one" or "one or more", unless otherwise indicated. Thus, the articles are used in this specification to refer to one or more than one (i.e., to "at least one") of the grammatical objects of the article. By way of example, "a component" means one or more components, and thus, possibly, more than one component is contemplated and can be employed or used in an implementation of the described processes, compositions, and products. Further, the use of a singular noun includes the plural, and the use of a plural noun includes the singular, unless the context of the usage requires otherwise.

What is claimed is:

1. A method for modifying a foam wall structure comprising:
    (a) frame members comprising:
        (i) a first member;
        (ii) a second member spaced apart from the first member; and
        (iii) connecting members extending between the first member and the second member, wherein the first member, the second member, and the connecting members each comprise a front surface and a rear surface that form a front frame surface and a rear frame surface;
    (b) a foam panel attached to the front frame surface, wherein:
        (i) the foam panel overlies the front frame surface; and
        (ii) the foam panel, the first member, the second member, and the connecting members define a cavity; and
    (c) a spray-applied polyurethane foam layer disposed within the cavity and on a surface of the first member, the second member, and the connecting members and adhered to the foam panel,
    wherein the method comprises depositing a high solids-containing, chemically-curing, and non-foaming liquid polymeric structural adhesive composition into at least one of (A) an aperture located within the spray-applied polyurethane foam layer, and (B) an aperture located between the spray-applied polyurethane foam layer and at least one of the frame members.

2. The method of claim 1, wherein the foam panel has a thickness of no more than 2 inches (5.08 cm) and comprises a facer material on at least onethe rear face of a polyisocyanurate foam, wherein the facer material comprises glass mat filled with recycled cardpanel and colored with carbon black, a foil or foil and glass composite, a fiberglass material or other fiber-reinforced sheet-like materials, a fiberglass mat, a glass fiber-reinforced cellulosic felt, a coated and polymer-bonded fiber mat, a foil, a coated foil, a foil and membrane laminate, a foil and glass composite, or a polyolefin film.

3. The method of claim 1, wherein the foam panel is attached to the front frame surface with mechanical fasteners.

4. The method of claim 1, wherein the foam layer has a density of at least 2.8 lb/ft$^3$ (44.9 kg/m$^3$), measured according to ASTM D1622-08.

5. The method of claim 1, wherein the foam layer comprises a thickness extending from the rear surface of the foam panel to a position intermediate the front frame surface and the rear frame surface so that a gap is formed within the frame between a rear surface of the foam layer and the rear frame surface, such as where the gap has a width from the rear surface of the foam layer to the rear frame surface of at least 1 inch (2.54 cm).

6. The method of claim 1, wherein the high solids-containing chemically-curing polymeric structural adhesive composition having a nonvolatile content of at least 90% by weight and a VOC content of no more than 10% by weight, based on the total weight of the structural adhesive composition.

7. The method of claim 1, wherein the chemically-curing polymeric structural adhesive composition comprises a one- or two-component polyurethane based structural adhesive, a single component moisture curing silicone, or a two component epoxy resin based system.

8. The method of claim 1, wherein the chemically-curing polymeric structural adhesive composition has a viscosity, measured @ 75° F. (24° C.), of at least 200,000 cps.

9. The method of claim 1, wherein the depth of the foam layer is 1 to 3 inches (2.54 to 7.62 centimeters).

10. The method of claim 1, wherein the width of the aperture is no more than 1 inch (2.54 centimeters).

11. The method of claim 1, wherein the aperture is located between the foam layer and at least one of the frame members.

12. The method of claim 11, wherein the aperture has a depth that is the full depth of foam layer.

13. The method of claim 11, wherein the aperture has a depth that extends only partially through the full depth of foam layer so that some portion of foam layer lies between the aperture and the foam panel.

14. The method of claim 11, wherein the aperture extends along the entire length of at least one of the frame members.

15. The method of claim 1, wherein the high solids-containing chemically-curing polymeric structural adhesive composition is deposited in an aperture located within foam layer.

16. The method of claim 15, wherein the aperture has a depth extending the full depth of foam layer.

17. The method of claim 15, wherein the aperture has a depth extending only partially through the full depth of the foam layer so that a portion of the foam layer lies between the aperture and the foam panel.

* * * * *

UNITED STATES PATENT AND TRADEMARK OFFICE
CERTIFICATE OF CORRECTION

PATENT NO. : 11,718,989 B2
APPLICATION NO. : 17/481523
DATED : August 8, 2023
INVENTOR(S) : David M. Baily et al.

It is certified that error appears in the above-identified patent and that said Letters Patent is hereby corrected as shown below:

In the Claims

Column 18, Line 66, Claim 2 please remove the texts "the rear" between the text "one" and "face".

Signed and Sealed this
Twenty-sixth Day of September, 2023

Katherine Kelly Vidal
*Director of the United States Patent and Trademark Office*